W. C. FERRIS.
SAFETY VALVE FOR PRESSURE COOKERS.
APPLICATION FILED APR. 5, 1919.
1,328,653.
Patented Jan. 20, 1920.
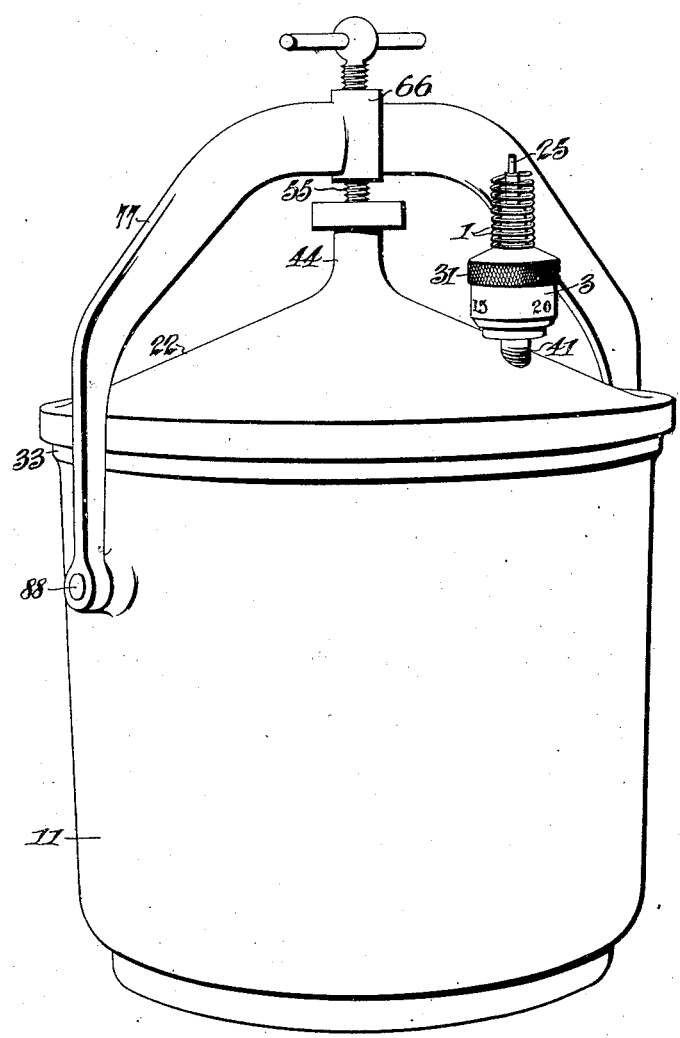
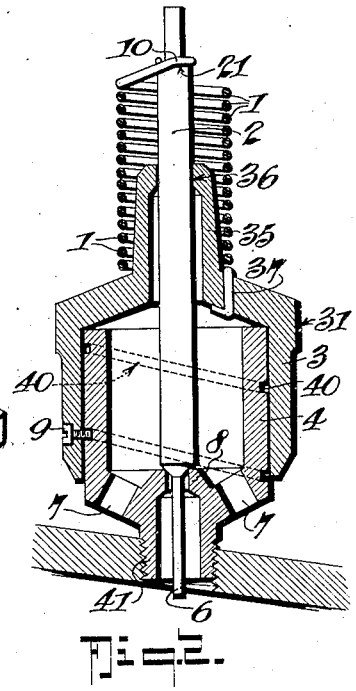
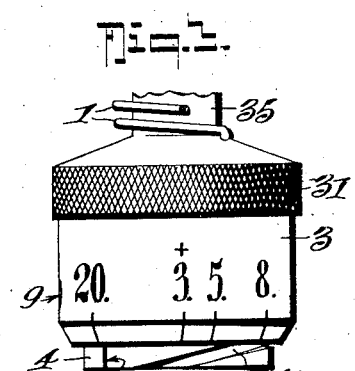
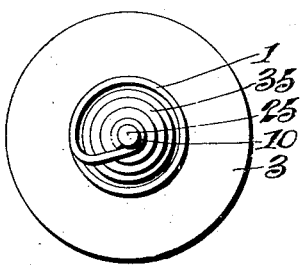
INVENTOR
Walton C. Ferris.
BY
Fred J. Dieterich
ATTORNEYS

UNITED STATES PATENT OFFICE.

WALTON C. FERRIS, OF LINCOLN, NEBRASKA, ASSIGNOR TO NATIONAL MANUFACTURING COMPANY, OF LINCOLN, NEBRASKA.

SAFETY-VALVE FOR PRESSURE-COOKERS.

1,328,653.

Specification of Letters Patent. Patented Jan. 20, 1920.

Application filed April 5, 1919. Serial No. 287,749.

*To all whom it may concern:*

Be it known that I, WALTON C. FERRIS, a citizen of the United States, residing at Lincoln, in the county of Lancaster and State of Nebraska, have invented a new and Improved Safety-Valve for Pressure-Cookers, of which the following is a specification.

My present invention has for its purpose to provide an improved safety valve, which, while adapted for uses for which blow-off valve devices are usually employed, is more particularly designed for use in connection with high pressure steam cooking utensils.

In the use of safety or blow-off valve devices on high steam pressure cookers, it is essential that the construction of the valve and the adjustments thereof be so simple that any housewife may quickly and conveniently handle the same.

Among other objects my invention has for its purpose to provide a safety valve device of the general character stated, that can be removably applied to a pot or kettle cover and which includes an improved and easily manipulated means for determining the pressure within the cooker and which takes the place of a pressure gage.

In its more subordinate features, my improved safety valve devices embody the peculiar combination and novel arrangement of parts hereinafter fully explained, specifically pointed out in the appended claims and illustrated in the accompanying drawings, in which:

Figure 1 is a perspective view of a high pressure steam cooker with my improved safety valve operatively applied thereon.

Fig. 2 is a vertical section of the valve device and a portion of the cooker cover, the shiftable needle valve being at the normal or closed position.

Fig. 3 is a top plan view of the said valve device.

Fig. 4 is a side elevation of a portion of the valve body and illustrates the adjustable cap, as set for holding the needle valve closed against steam pressure within the kettle up to 20 lbs.

In the drawings I have illustrated a high pressure cooker of that type for which my safety valve is particularly designed and which includes a kettle or pot 11 and a cover 22 that has a rim for fitting steam tight down onto the pot ledge 33.

The cover 22 includes a central post 44 which constitutes an abutment for receiving the lower end of a clamp screw 55 that passes through a threaded bore in a hub portion 66 which forms a part of a bail-like handle 77, the arms of which straddle the post 44 and engage stud pintles 88 formed or otherwise fixedly attached to the kettle, as shown.

While my safety device, as before stated, is especially designed for use with a cooker of the type shown and described, it is to be understood that the use is not limited to such specific type of cooker, since it may be readily adapted for use in connection with the top or covers of other types of high pressure cooking utensils.

My improved safety valve, the construction of which is clearly shown in Figs. 2 and 4, comprises a bowl-shaped body 4 in the bottom of which is located a raised valve seat 8, which has squared and knife like edges to prevent the formation of a water cushion that causes a slight leak.

7—7 designate holes in the bowl bottom and they are so located around the valve seat as to drain all condensation away from the valve seat 8 as well as allow the escape of the steam from the kettle that passes the valve seat and enters the bowl 4.

The outside of the bowl-shaped body 4 is provided with a quick acting spiral thread 40, the purpose of which will presently appear.

3 designates a pressure regulating cap that snugly fits onto the body bowl 4 and is adjustable along the said body by a pin 9 that screws through the cap 3 and engages the spiral thread 40 in the bowl 4, as shown.

Cap 3 has a knurled head portion 31 and is formed with a tubular vertical extension or tower 35 that has an aperture 36 in the upper end thereof which constitutes a guide passage for the needle valve 2 that extends beyond the said apertured end of the tower 35 and terminates in a finger piece 25.

Finger piece 25 constitutes a handy means for lifting the valve 2 to relieve the vacuum created in the pressure cooker, when the same has been allowed to cool with the cover on tight.

A tension spring 1 for applying down pressure on the valve 2 is mounted over the extension or tower 35, the latter being tapered so that the spring 1 works freely and without friction.

By mounting the tension spring 1, as shown and described, it will be noted that the same is outside and away from the steam and possible discharge and it is protected against possible blows by the tapered projection 35 of the cap 3.

The lower end of the spring 1 is attached to the cap 3 by passing the same through a small hole 37 in the cap top and bending over the inside of the said top, to which it is secured by putting a drop of solder thereon.

The body 4 has a pendent threaded extension 41 for screwing into a threaded aperture provided therefor in the cooker cover.

Valve 2 has a pin-like extension 6 at the lower end, which serves as a guide for placing the valve on the seat 8 and also for clearing the intake hole of bits of food, it being understood that by slipping the upper end 10 of the spring 1 from the shouldered portion 21 of the valve stem, the valve 2 may be readily withdrawn when it is to be used for clearing the escape holes 7—7, as above mentioned.

Graduations upon the cap 3, see Fig. 3, are provided to indicate the "popping off" pressure at different points in one revolution of the cap 3, which, in the present construction of the spiral threadway and pin connection is necessary to change the "popping off" points from 0 lbs. to 20 lbs.

The lower end of the bowl 4 has a cap setting line 42, as shown.

The manner in which my valve device is manipulated and operates is explained as follows:

When the cap 3 is screwed down upon the bowl 4 in which the valve seat 8 is located, the pressure of the tension spring 1 on the valve 2 is increased and, when the said cap 3 is screwed off, the pressure on the said spring is decreased.

This arrangement of parts makes it possible to determine the steam pressure within the cooker, at any time, by simply turning the cap 3 back until the steam begins to escape, which operation constitutes a substitute for a pressure gage.

An advantage of the spring 1 is that it is located and works concentrically about the needle valve 2, causing little friction and therefore sensitive opening and closing of the safety valve.

Being a tension spring, through use or accident, it can only become weaker, thereby causing the valve to blow-off at a lower pressure and making the possibility of accumulation of a dangerous amount of steam pressure within the cooker impossible.

It will be noticed that the valve 2 has but one guide, that at the upper end of the projection 35 and that guide a loose fitting one and located at a considerable distance from the valve seat 8, such arrangement making the chance of gumming up and possible sluggish action of the valve, improbable.

The pin 9 in the cap 3 and the quick acting spiral thread 40 cut in the bowl are provided for economy in manufacture and also keeps the pressure exerted against the cap, at times, from blowing the cap off and, as but a single pin 9, at one side is used, it causes the cap 3 to bind slightly.

What I claim is:

1. In a device of the character described, a bowl having a valve seat passage adapted to communicate with the cooker chamber, a cap fitted over the bowl and having a valve stem guide, a valve mounted with its stem in the said guide and adapted to close said valve seat passage, and a tension device connecting said valve with the said cap, said bowl having provision for the escape of steam, when the valve seat passage is open, means for holding said cap on said bowl in different positions, whereby to increase or diminish the effect of said tension device according to the position of the said cap.

2. In a device of the character described, a bowl having a valve seat passage adapted to communicate with the cooker chamber, a cap fitted over the bowl and having a valve stem guide, a valve mounted with its stem in the said guide and adapted to close said valve seat passage, and a tension device connecting said valve with the said cap, said bowl having provision for the escape of steam, when the valve seat passage is open, means for holding said cap on said bowl in different positions, whereby to increase or diminish the effect of said tension device according to the position of the said cap, said cap and said bowl having provision for indicating the degree of said tension, whereby to gage the steam pressure in the cooker.

3. A safety valve for steam cookers comprising a bowl-shaped body having a valve seat passage adapted to communicate with the cooker chamber and an external spiral thread, a cap fitted on the bowl and having a pin connection for engaging the spiral thread in the bowl, the said cap having a valve stem guide, a valve mounted in said guide and adapted to close the said valve seat passage, and a spring device connecting the valve with the cap whose tension is increased or diminished as the cap is screwed off or on the bowl-shaped body, the said body having provision for the escape of steam, when the valve seat is open.

4. A safety valve for steam cookers comprising a bowl-shaped body having a valve seat passage adapted to communicate with the cooker chamber and an external spiral thread, a cap fitted on the bowl having a vertical tapered hollow extension provided with a valve stem guide in the upper end thereof, the said cap having a pin connection for engaging the spiral thread in the bowl, a valve mounted in the said guide and adapted to close the said valve seat passage, a coil spring device mounted on the tapered projection of the cap, one end of which is connected with the valve stem and the other end of which is connected to the cap and whose tension is increased or diminished as the cap is screwed off or on the bowl-shaped body, the said body having provision for the escape of steam, when the valve seat is open.

5. As a new article, a combined blow-off and gage for high pressure steam cookers, comprising a bowl-shaped body having a raised valve seat in the bottom thereof, drain openings that surround the said valve seat and a pendent neck for screwing the article into a cooker cover, the said bowl also having an external spiral thread groove and a stop line, a cap rotatably mounted on the bowl and having a pin connection with the spiral thread groove, whereby as the cap is turned, it will be fed up or down along the bowl, the said cap including a hollow tower having a valve stem guide in the upper end thereof, said cap also having indicator numerals on the outer face adapted for being brought into register with the stop line on the bowl to indicate the pressure within the cooker, the said valve stem having its valve end adapted for engaging the valve seat and provided with a pin-like extension that projects through the valve seat passage, the other end of the valve stem being offset to form a shoulder and a finger grip, and a coil spring, one end of which terminates in a loop to removably connect with the shouldered end of the valve stem, the said spring being adapted for fitting over the tower projection of the cap and to seat on the cap top, that end of the spring that engages the cap top being connected to such top, whereby, when the cap is turned to move up or down on the bowl, the tension of the spring is decreased or increased.

WALTON C. FERRIS.